March 22, 1955     H. BERGERHOFF     2,704,494
FOCAL PLANE CAMERA SHUTTER
Filed Jan. 23, 1951                                 5 Sheets-Sheet 1

INVENTOR
HUGO BERGERHOFF
BY
ATTORNEY

March 22, 1955 H. BERGERHOFF 2,704,494
FOCAL PLANE CAMERA SHUTTER
Filed Jan. 23, 1951 5 Sheets-Sheet 3

INVENTOR
HUGO BERGERHOFF
BY
ATTORNEY

United States Patent Office 2,704,494
Patented Mar. 22, 1955

2,704,494
FOCAL PLANE CAMERA SHUTTER

Hugo Bergerhoff, Frankfurt am Main, Hesse, Germany

Application January 23, 1951, Serial No. 207,395

Claims priority, application Germany February 1, 1950

3 Claims. (Cl. 95—55)

The present invention relates to improvements in focal plane camera shutters.

It is the principal object of this invention to provide a camera shutter arrangement affording great economy in manufacture and simplicity of construction and operation.

It is a more specific object of the invention to provide a camera shutter comprising relatively few parts which can be easily mounted without the aid of auxiliary means, such as bolts, rivets, screws and the like.

An additional object of the invention is to provide a camera shutter of which all the constituent parts may be manufactured by stamping, molding or die casting.

It is also an object of the invention to provide a camera shutter requiring little space, particularly in depth.

The various objects and advantages of the invention, as hereinbelow described in more detail, are accomplished by providing a focal plane camera shutter comprising at least two slidable shutter members whose relative distance from each other may be adjusted to form a predetermined aperture and which may be slid in unison, while keeping the set distance, in the region of the camera aperture. The camera aperture is preferably fixed but, in certain cases, it may itself be adjustable relative to the camera housing. The slidable shutter members are coupled together and may be made of rigid or elastic material, for example aluminum, thin sheet metal, synthetic materials and the like. At least one of the shutter members is operably connected with a shutter tensioning or actuating mechanism. The members are so shaped that they may be moved relative to each other in flat or curved, preferably cylindrical, planes. In the embodiments described and illustrated, the shutter members and corresponding guide means are flat. But it is within the scope of the invention to arrange the shutter members and guide means therefor curved so that the members move similarly to the motion of a slide valve.

In accordance with one feature of the invention (Figs. 1, 2, 14 and 16), the two slidable shutter members are coupled together by means of a joint, for instance a double or multiple joint, adapted to cooperate permanently or intermittently with an adjustment device. The coupling is so arranged that the relative movement of the two shutter members to a predetermined distance from each other may be halted by force, friction or by the particular form given to the parts themselves.

In one embodiment of the invention (Figs. 16 and 17), the two shutter members are slidably mounted on a slidable plate which is provided with a cutout corresponding to the camera aperture and which is, in its turn, longitudinally reciprocable within the region of the fixed camera aperture. The shutter members are operatively connected with the slide plate by means of two coupling levers, such as angle levers, which are pivotably mounted on the slide plate and whose one arm cooperates with a respective shutter member and whose ends of the other arm move in an adjustable guide rail, whereby the shutter aperture width may first be set by appropriate adjustment of the guide rail and the two shutter members may then be longitudinally reciprocated together with the slide plate in front of the camera aperture while keeping the set shutter aperture.

The adjustment of the relative distance of the two shutter members, which determines the desired shutter aperture width, is effectuated in such manner that, once adjusted, this distance is accurately maintained at least during the common movement of the members which corresponds to the shutter release operation, i. e. the exposure. For this purpose, the joint coupling element may be movable in longitudinal guide means, such as for instance a rail, and said guide means may be movable perpendicularly or at another angle to the shutter movement.

The coupling element may be provided with stops whose position is changeable by means of reciprocating, pivotable or revolvable means (Figs. 4, 5 and 18), whereby the adjustment of the coupling and thereby the relative distance of the two shutter members may be effected at a predetermined locus, preferably in an end position of the shutter members. In this case, the members are preferably locked in the set position by means of friction or force. Since the adjustment of the coupling by movable stops is effected at a predetermined point of the path of motion of the shutter members, it is desirable to arrange the coupling so that it is in equilibrium whereby its position, which is determined by the adjustment of the stops, is not changed during movement by accelerating forces.

The shutter is tensioned or actuated by sliding the two shutter members past the camera aperture after they have been pre-set at the desired distance. Premature exposure may be prevented in accordance with one feature of the invention (Figs. 6 and 9) by providing a pivotable or slidable covering disc which is adapted to cover the camera aperture at least in the region of the shutter aperture. The covering disc is so shaped and arranged that, after actuation of the shutter, it is automatically retracted from the camera aperture so as to make exposure possible. In one modification of the invention, the covering disc forms part of the shutter tensioning or actuating mechanism. The shutter is actuated for instantaneous exposure by passing the two pre-set shutter members in front of and past the camera aperture under the action of a tension spring. When time exposure is desired, the movement of the shutter members past the camera aperture is effected stepwise so that the shutter aperture is held in front of the camera aperture for any desired interval. In the latter instance, the shutter aperture has the width of the camera aperture.

The invention also features advantageous shutter actuating means (Figs. 10 and 11) comprising pivotable, spring-tensioned levers which are adapted to cooperate, on the one hand, with at least one of the shutter members and, on the other hand, with an actuating element. The levers are pivotable in unison, for time exposure, and at least one of the levers is pivotable independently, for instantaneous exposure.

The levers may have two arms and are preferably pivotable around a common axis. One arm of each of the levers is formed with a hook or recess for engaging and retaining a pin or the like attached to one of the shutter members, thereby to lock the same in position, while the other arm of each of the levers is adapted to be engaged by a slidable, pivotable or rotatable actuating element. It is desirable to form the hooked or recessed arms of unequal length, in accordance with the camera aperture arrangement. The actuating element may include a pivotable and slidable actuating lever which, in one pivoted position, cooperates merely with one of the levers to effect instantaneous exposure, and in another position cooperates with both levers to effect time exposure.

In one embodiment of the shutter release mechanism, each of the two shutter release levers is adapted to cooperate with separate slidable or pivotable actuating elements, one of which is adapted to drive also the other release lever or levers. In this modification, the instantaneous and time exposures are effected by separate actuating elements which are operable independently. The actuating elements preferably have the form of slidable shafts which are supported loosely between stops and, if desired, in guide means. For instance, they may be slidably arranged on a plate and the guide means or the stops may be stamped or punched out of the plate, or the plate with its stops and guides may be die cast since the forms are so simply chosen that casting will encounter no difficulties.

In the last-mentioned embodiment of the shutter release mechanism, the actuating shaft effecting time exposure is adapted to cooperate with stop faces of both release levers, the stop face of one lever being set off slightly relative to the stop face of the other lever in the longitudinal direction of the actuating shaft. This arrangement assures dependable operation in that the time exposure lever always engages and retains the shutter members in the region of the camera aperture so that time exposure ensues, as will be more fully explained in the description of Fig. 11. The time exposure release lever may also be provided with a stop face or an extension which engages and drives the instantaneous exposure release lever or a stop face of its actuating shaft so that time exposure necessitates actuation of only one shaft. The actuating shaft is provided with an automatic and/or actuatable locking device to enable actuation of the time exposure release lever for any desired period.

The faultless pivotal movement of the release levers is assured, according to one feature of the invention, by providing at least one of said levers with a special guide means, such as an extension, adapted to slide in a slot in the camera housing or of one of the actuating shafts.

In a modification of the above embodiment of the shutter release mechanism (Fig. 13), special safety means is provided to assure that the time exposure release is actuated only when the shutter is fully opened. This is accomplished by coupling the time exposure release means, and more particularly the actuating shaft, with the shutter adjustment device. This coupling may be effected by a guide element, such as a pin, attached to the time exposure actuating shaft, said guide element cooperating with a movable element of the time adjustment device, said movable element consisting of a partly segmental and partly radial slot in a shutter adjustment disc, for instance.

In one particularly economical embodiment of the invention, the shutter members including the coupling means are loosely slidable and preferably locked only at one side. The actuation of the shutter is effected merely by turning the camera 90° so that, after release of the locking means, i. e. after actuation of the release lever, the shutter members move automatically and by gravitation downwardly so as to effect exposure. This arrangement, however, is mainly adapted to cameras of quadratic format.

The manufacture of the shutter is simplified and the number of shutter parts greatly reduced by making the individual movable and/or fixed elements with such surfaces that eyes, hollow portions, rivet, screw or bolt connections are avoided. The various stop faces and guides may be stamped or bent out of the elements themselves, or produced by molding or die casting.

In accordance with a special feature of the invention, the dependable relative movement of the various elements is assured by giving the parts appropriate shapes, such as rounding of edges, extensions and the like, whereby the individual elements overlap each other at least at one edge or slide over each other during relative movement of the elements.

The above and other objects, features and advantages of the present invention will be described more in detail in connection with the accompanying drawings which show in a schematic manner, various preferred embodiments of the invention, and wherein Fig. 1 is a top view of the shutter, uncovered, showing the slidable shutter members in relation to the camera aperture;

The drawings show the essential parts and their relation to each other and omit unimportant details well known to those skilled in the art since such details would only tend to encumber the drawings and make them obscure. Also eliminated from the drawings for the sake of clarity are various small bent projections or rims provided at the edges of various parts and plates of the shutter to serve as guides for movable elements and/or to equalize the levels of the operating parts. Their disposition will be obvious to the skilled in the art.

Figures 1, 1A:
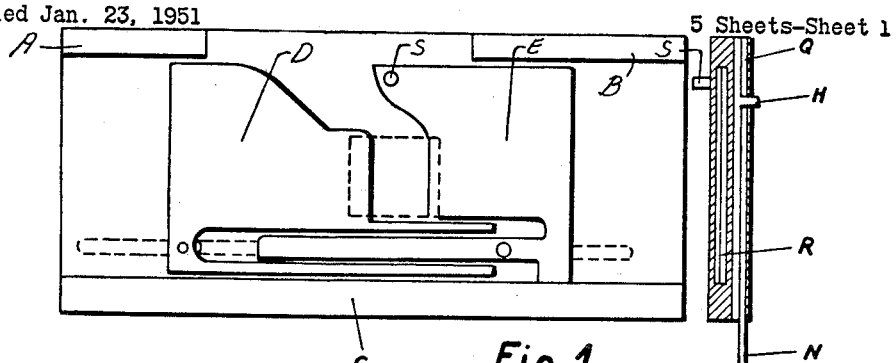
Fig. 1a is a section through the shutter.

Referring now more particularly to the drawings, Fig. 1 shows a thin rectangular mounting plate having a central rectangular aperture (broken lines) for admitting light to the interior of the camera. The plate is provided with ledges A, B, C, said ledges having about double the thickness of the two layers D and E which are adapted to slide between the ledges and thereby to cover and open the central aperture. Slidable members D and E, which form the shutter aperture, lie on the mounting plate and are provided with cooperating tongues whereby they may be telescopically moved into each other. One of the members has attached thereto pin S which is engageable by actuating means, as further described hereinbelow. The various parts shown in Figs. 1 and 2 are placed in space R, as shown in Fig. 1a.

Figures 2, 3:
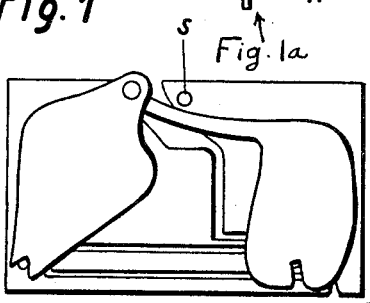
Figs. 2 and 3 show one embodiment of a coupling arrangement for the shutter members, with wider and narrower shutter aperture, respectively.

The shutter members D and E are coupled together, in accordance with one embodiment of the invention, as shown in Figs. 2 and 3, by means of links F and G. These links form a joint at pin H while being pivotally connected to parts D and E, respectively, at their other extremities. If pin H is moved transversely, links F and G force members D and E apart or together, thereby narrowing or widening the aperture.

Figures 16, 17:
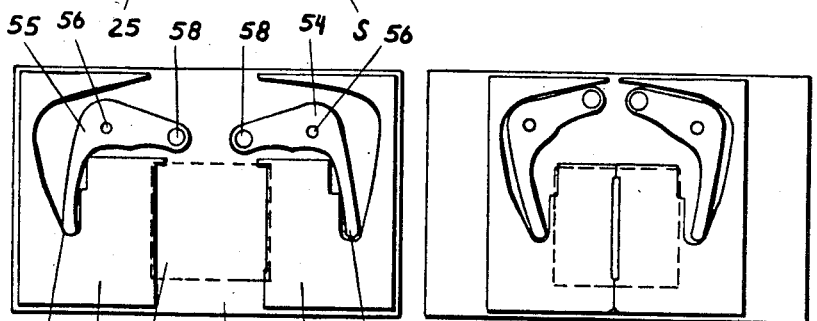
Figs. 16 and 17 show still another emobidement of the coupling arrangement of the shutter members, in different operational position.

Figs. 16 and 17 show another embodiment of the coupling arrangement. Shutter members D and E are arranged on sliding plate 52 which is provided with central aperture 53 and is slidable in the camera housing in the region of the camera aperture. D and E are coupled to sliding plate 52 by means of angle levers 54 and 55 which are pivotable around axle 56 mounted on plate 52. One arm of each of the levers 54 and 55 is adapted to cooperate with respective recesses 57 in members D and E while pins 58 at the end of the other arms of the levers move longitudinally in slots in an adjustment device, as described hereinbelow in connection with Figs. 4, 5 and 18. Depending on the position of the actuating element (not shown), the pins 58 determine the position of levers 54 and 55 and thereby the aperture width, i. e. the relative position of D and E.

Figure 14:
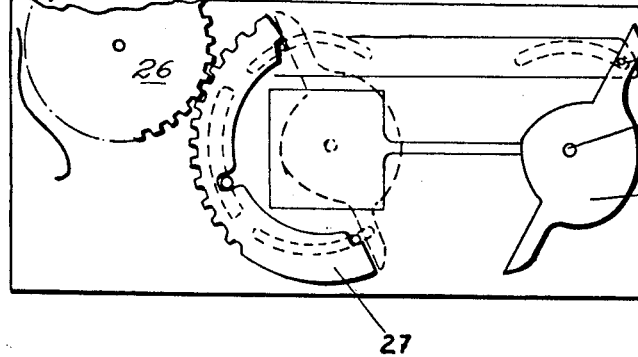
Figs. 14 and 15 show different views of another embodiment of the coupling arrangement of the shutter members, the adjustment device for the coupling being eliminated in Fig. 15.
Figure 15:
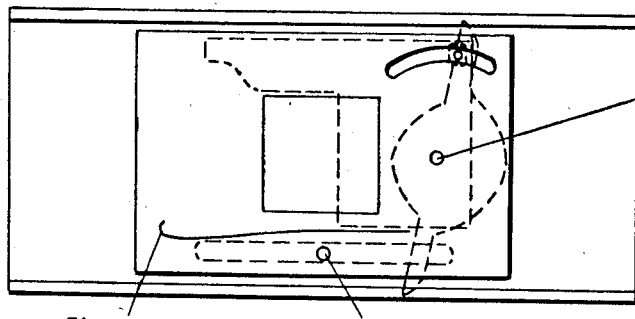

Figs. 14 and 15 show another embodiment of the coupling arrangement as well as cooperating means for adjusting the shutter aperture width. The rectangular plate with its quadratic central cut-out is inserted in space R (Fig. 1a). The shutter member (shown in broken lines in Fig. 15) is longitudinally slidably arranged on the plate, said member being adapted to vary the aperture width by its longitudinal movement. The shutter member is also provided with lugs moving in guide slots but these are not shown in the drawing for reasons of clarity. The spring fastened at 25 exerts sufficient friction on the member shown in broken lines to keep it in its set position when both shutter members are moved by actuating pin S which projects rectangularly from the plate. Parts 26, 27 and 28 are arranged and move in space Q (Fig. 1a). Driving pinion 26 transmits movement to semi-annular toothed wheel 27 which is rotatable around the axis of the aperture along three circular slots in the covering plate, three projections being provided to engage said circular slots. Coupling part 29 is pivotally mounted on pin 29 of the rectangular sliding plate. Pin 29 projects through a slot in the plate which separates spaces R and Q. When the shutter is tensioned, part 28 is in full contact with part 27 (see broken lines, Fig. 14). Since it projects through the separating plate with pin 30 engaged by a slot in the plate, it is adapted to reciprocate longitudinally the shutter member shown in broken lines by engaging a small slot in said member. If the aperture width remains constant for a number of times, part 28 will not move, except for its longitudinal reciprocating movement. But if pinion 27 has been re-set, part 28 will be pivoted around 29 upon contact with the end of toothed wheel 27.

While the above-described shutter aperture adjustment means is specific to the coupling arrangement of Figs. 14 and 15, there will now be described adjustment devices applicable to the embodiments of Figs. 2 and 16.

Figure 4:
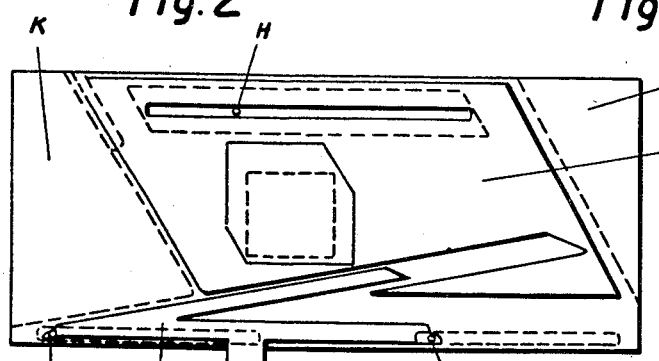
Fig. 4 shows one embodiment of an adjustment device for the shutter members.

Fig. 4 shows one embodiment of an adjustment device for shutter slides D and E. There is shown a rectangular plate of the same size as the mounting plate of Fig. 1, the covering plate resting on ledges A, B and C. Rhombic plate J is slidably mounted on the covering plate between guides K and L which are created by increasing the thickness of the covering plate. There may also be provided a lug in one corner of the rhombus and a cooperating groove in the covering plate to assist in guiding the rhombic plate. If the V-shaped part (bottom of Fig. 4) is longitudinally displaced at N along longitudinal slots in the plate cooperating with projections O and P of the V-shaped part, rhombus J is moved up and down between guides K and L and, by means of a longitudinal slot in the rhombus which drives pin H, the pin will be guided so that it can always be slidably moved in a longitudinal direction. The camera aperture remains uncovered during movement of the rhombus by providing a hexagonal cut-out in the rhombus. Pin H is transversely movable within a cut-out in the plate, as shown in broken lines. All flat parts are of sufficient thickness and have rectangular edges so that they cannot glide over each other after they are in operative position by mounting the covering plate thereover. As appears from the schematic section of Fig. 1a, the shutter parts shown in Figs. 1 and 2 are placed in space R and the parts shown in Fig. 4 (or 5) are placed in space Q. After the covering plate is mounted on ledges A, B and C, the shutter adjustment device is operable and can be actuated by movement of pin S.

Figure 5:
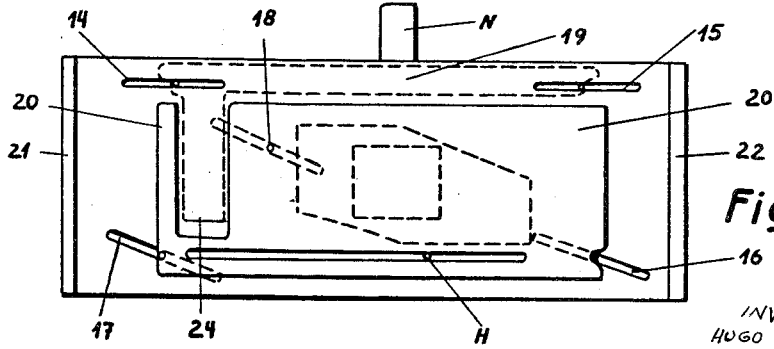
Fig. 5 shows another embodiment of such an adjustment device.

Fig. 5 shows another embodiment of the shutter aperture adjustment device. There is shown a rectangular covering plate provided with slots 14, 15, 16, 17 and 18, superposed over slides 19 and 20. Slide 20 is diagonally guided in slots 16, 17 and 18 and drives pin H by means of a longitudinal slot engaging the pin. If slide 19 is longitudinally displaced at N, it moves slide 20 so that pin H is forced in a perpendicular direction. Slides 19 and 20 are mounted in the space created by the two ledge-like rims 21 and 22 on the base plate. The two slides touch only at 24 to avoid wedging during their relative movements.

Figure 18:
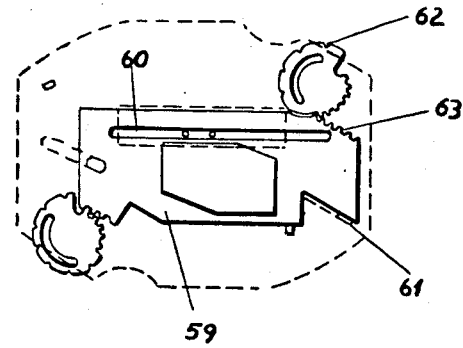
Fig. 18 is a top view of another embodiment of an adjustment device for the shutter members.
Figure 19:
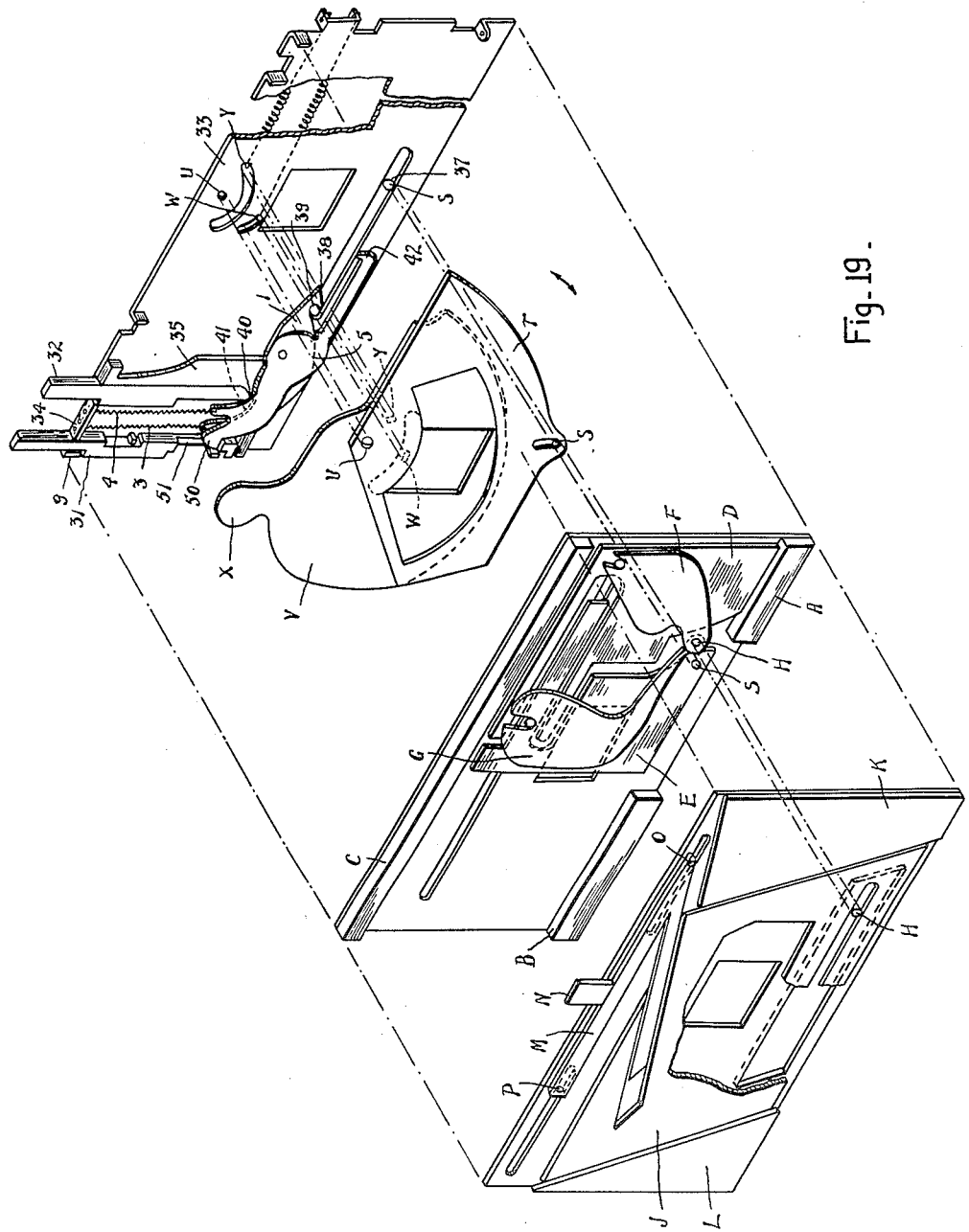
Fig. 19 is an exploded view of the complete shutter mechanism of one embodiment of the invention.

Another embodiment of the adjustment device, as adapted particularly to the coupling arrangement of Figs. 16 and 17, is shown in Fig. 18. Adjustment plate 59 is diagonally movable in guides 61 and is provided with a longitudinal slot 60 (similar to the longitudinal slots of the adjustment device shown in Figs. 4 and 5). Pin 58 (or pin H of Figs. 4 and 5) is engaged and driven by slot 60. The adjustment is effected by pinions 62 driving plate 59 by means of rack 63 provided thereon.

Figure 6:
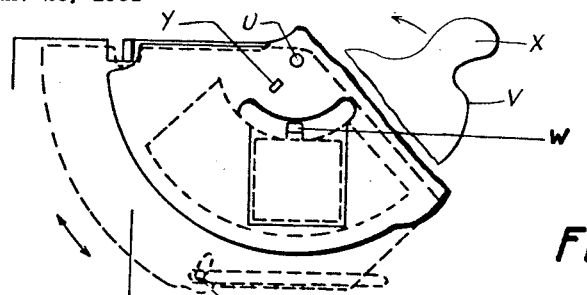
Fig. 6 shows an arrangement of aperture covering means which simultaneously serves as actuating device for the shutter.

Fig. 6 shows the feature of the invention wherein the shutter tensioning means is combined with an aperture covering means. Pin S, which projects from the base plate through a slot (see Figs. 1a and 10a), is actuated by disc T (broken lines) which is rotatable around pin U. Pin S moves in a radial slot of disc T. During tensioning of the shutter, disc T isd riven by disc V by means of stud W, but only after disc V (also rotatable around U by means of handle X) has been moved sideways sufficiently over the camera aperture to cover the shutter aperture as long as the tensioning movement lasts.

Figure 7:
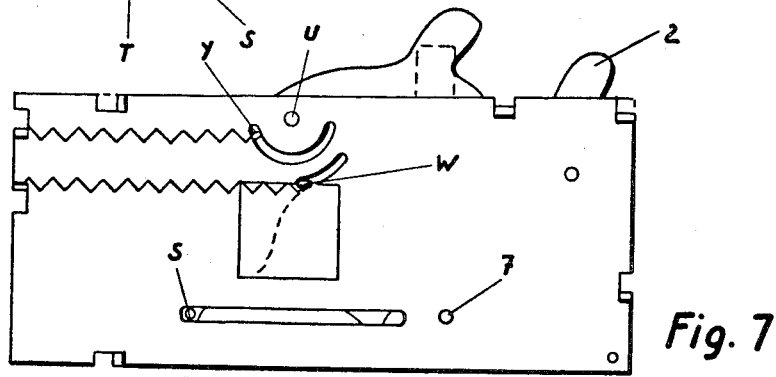
Fig. 7 shows a bottom and Fig. 8 a top view of the complete shutter incorporating the covering means of Fig. 6.
Figure 8:
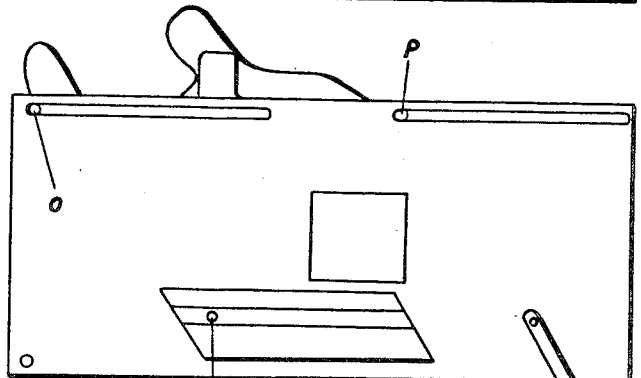

As shown in Fig. 7, discs V and T are moved under tension of springs which are hooked into studs W and Y. Disc V returns, therefore, into its original position after pin S has been brought into tensioned position, and the camera aperture is uncovered. The base plate is provided with small projections which are rectangularly bent so as to provide sufficient space between the base and a cover plate to allow the flat parts described in connection with Figs. 4 or 5 and Fig. 6 to move freely therein in two layers (see schematic side view of Fig. 10a).

Figure 9:
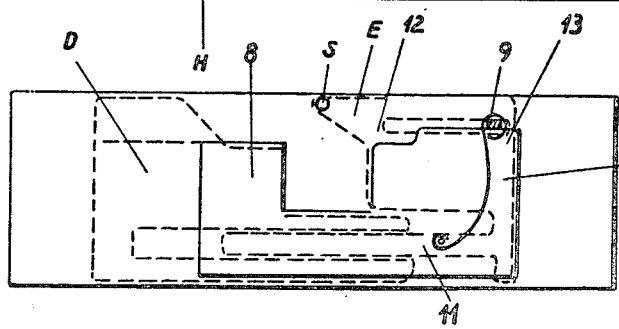
Fig. 9 shows another embodiment of an aperture covering means.

Another embodiment of the covering means than that shown in Fig. 6 is illustrated in Fig. 9, this embodiment being adapted to use with cameras where a tensioning lever X would not be feasible and pin S is actuated by different means. Fig. 9 shows a flat part 8 underlying slides D and E (shown in broken lines). Part 8 slides with an upright projection 9 in a longitudinal slot of slide E bounded by lines 12 and 13. Steel leaf spring 10, which is movably attached to E at 11, presses part 8 with sufficient tension to hold projection 9 at the desired end of the slot in E. Projection 9 projects also through a slot in the upper covering plate of the shutter. When it moves to the right( as seen in the drawing) to end 13 of the slot, part 8 will be stopped and slides E and D will be moved by one picture width so that slide D covers the aperture. During this movement, projection 9 with spring 10 have travelled toward the left end 12 of slide E. During this left movement, D, E and 8 will travel together one picture length, and part 8 will be stopped when projection 9 reaches 12 while slide E will continue to move the length of its slot. This movement of slide E will result in the transposition of projection 9 and spring 10 to the right end 13 of the slot. This to and fro movement of parts 8 and E results in the opening of the aperture during movement to the right and covering thereof during movement to the left.

Figures 10, 10A:
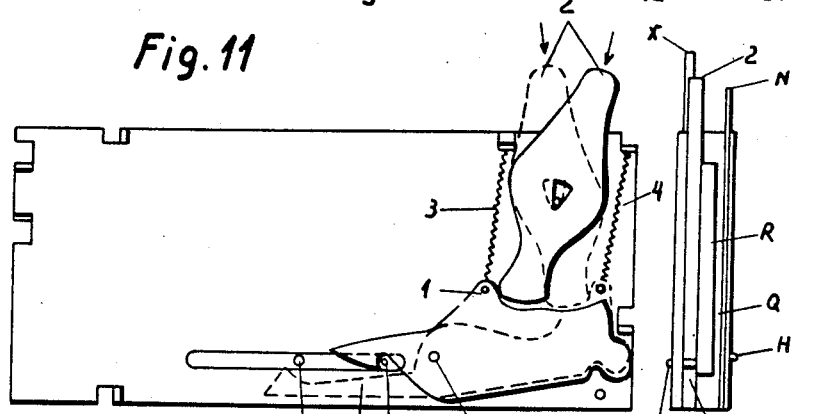
Fig. 10 is a top view of a release mechanism, a single actuating element serving for instantaneous and time exposure.
Fig. 10a is a section through the shutter incorporating the release mechanism.

Fig. 10 shows the embodiment of a release mechanism wherein a single actuating element is used to effect instantaneous and time exposure. At the end of the tensioning movement, pin S glides under the spear-like end of instantaneous lever 1. Helical springs 3 and 4 permanently press levers 1 and 5 against the actauting element. When element 2 is in the position shown in full lines, it engages only lever 1 upon being depressed. If the actuating element is turned left (broken lines), its opposite end snaps toward the right, thereby engaging instantaneous lever 1 and time lever 5. When element 2 is depressed in the latter position, instantaneous lever 1 will reelase pin S and time lever 5 will stop it at 6 until the actuating element is released. Levers 1 and 5 rotate around hub 7 under tension of springs 3 and 4 until returned to their original position, the end hook of lever 5 releasing pin S and the spear hook of lever 1 returning to its original position. The path of the shutter aperture is so measured that the entire camera aperture is open at position 6 of pin S. Thus, this arrangement makes it possible to use a single actuating element for instantaneous as well as time exposure by the simple expedient of pivoting the element into different positions. This arrangement is possible because of the special configuration given to parts 1, 2 and 5 and by pivoting element 2 on a pin movable in a triangular slot.

Figure 11:
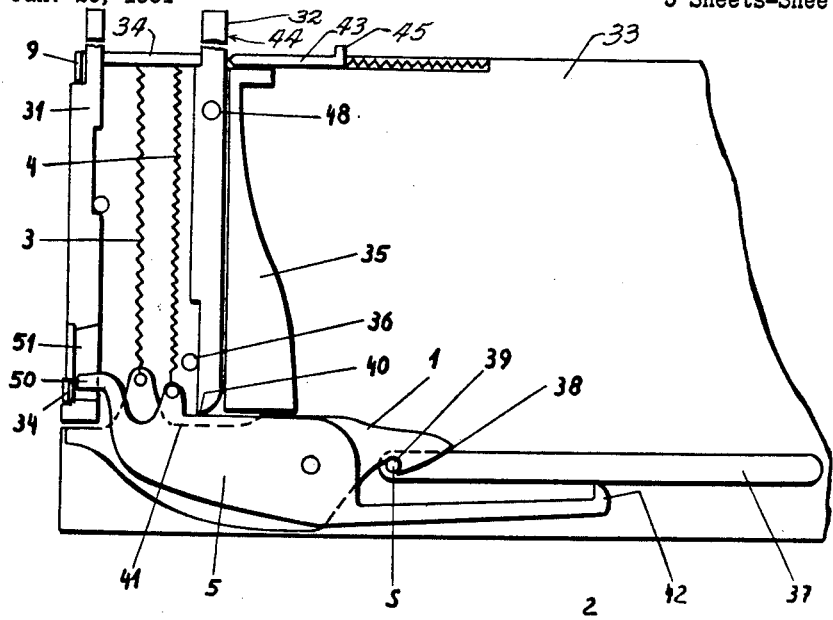
Fig. 11 shows a release mechanism having separate actuating elements for time and instantaneous exposure.
Figures 12, 13:
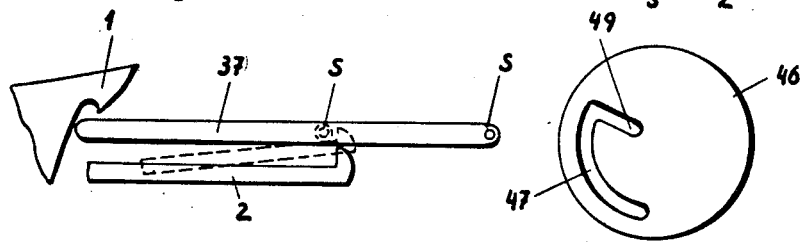
Fig. 12 shows a detail of Fig. 11, the release levers being shown in different positions.
Fig. 13 shows one part of a shutter adjustment device which is coupled with the actuating element of the shutter of Fig. 11.

Figs. 11, 12 and 13 show another embodiment of the shutter release mechanism. Actuation of levers 1 and 5 is effected by shafts 31 and 32 whose lower ends are adapted to engage levers 1 and 5, respectively. The entire release mechanism is mounted on a plate 33 which is part of the shutter arrangement, the individual parts being loosely movable in guides or between stop faces. The guides are formed, for instance, by bent edges 34 of the plate, or by separating wall 35 which also serves to prevent light from entering into the interior of the camera. Stops 36 for shafts 31 and 32 are shown as formed by pins arranged on plate 33. This simple construction makes it possible to form all parts by molding or die casting and to assemble them without screws, rivets or the like.

Guide slot 37 is provided in plate 33, pin S being adapted to reciprocate in this slot. The position of pin S, as shown, corresponds, for instance, to the tensioning position of the shutter which is effected by moving pin S to the left (in the drawing) so that the hook 38 of lever 5 is lifted by the pin and the pin snaps into the recess 39. If instantaneous exposure is desired, shaft 31 is depressed whereby lever 1 is moved counter-clockwise against the tension of spring 3, releasing pin S of the shutter and enabling the pin to move in the other direction in slot 37 which effects exposure. Depression of shaft 32 results in time exposure by effecting the counter-clockwise movement of lever 5 against the tension of spring 4. Lever 5 drives lever 1 either instantaneously or after a short time interval, i. e. when point 40 of shaft 32 engages the stop face 41 (broken lines) of lever 1, whereupon both levers are pivoted in unison until hook 42 on one arm of lever 5 traverses the path of pin S (see Fig. 12, broken lines) and, on the other hand, pin S is free by the pivotal movement of lever 1. Now pin S and the shutter members connected therewith can move into the position determined by hook 42, i. e. the shutter aperture is uncovered. After the pressure on shaft 32 is released, pin S is free to continue movement since the hook 42 is removed from its path and the aperture is closed again. To assure that hook 42 is moved into the region of slot 37 before pin S is released by lever 1, the movement of lever 5 is given a phase lead. This is accomplished by setting off the stop faces of the two levers in relation to point 40, as was indicated above in connection with the description of stop face 41. This arrangement corresponds to a ball release.

A T release is effected by provision of additional locking means 43 which is adapted to engage shaft 32 in corresponding rest 44 when the shaft has reached its end position and which holds the shaft in this position until lock 43 is retracted by handle 45 whereupon the shaft automatically resumes its original position.

A further safety device is provided according to Fig. 13 which assures that the time exposure is effected only when the shutter aperture is opened to its widest position. The release member, for instance shaft 32, is coupled with the shutter, particularly the shutter adjustment device by means of a rotatable disc 46. It is assumed that the adjustment of the shutter is effected by rotation of disc 46, for instance in the region of the angle determined by slot 47. Slot 47 is adapted to be engaged by a pin 48 arranged on shaft 32, the relative position of pin 48 and slot 47 being so arranged that shaft 32 can be moved only in a certain position of the disc which position corresponds to the complete opening of the shutter aperture. At this position, the slot 47 is radially distorted at 49 and pin 48 and shaft 32 can move in slot 49.

To guide either of the release levers 1 and 5, one arm of lever 5, for instance, is provided with an extension 50 which moves in recess 51 of shaft 31.

The entire shutter arrangement according to the invention, including the shutter members, the coupling elements and the release mechanism, as hereinabove described, may be mounted in a flat box and inserted in a camera housing in appropriate guide means. The various layers may be held in their relative positions by means of a pin arranged in one corner of the box and piercing through all layers.

The novel shutter arrangement of the present invention is well adapted for use with stereo cameras by the simple expedient of doubling all essential parts, i. e. by constructing the shutter so that two camera apertures are operable simultaneously. The corresponding parts may be fixedly connected to each other or they may be coupled in any suitable manner. In this manner, only a single shutter actuating mechanism will be required to operate the double parts. For instance, the arrangement shown in Fig. 15 may be adapted for use in a stereo camera by doubling the slidable shutter members and connecting them in series with the adjustment device 26, 27, 28 and the shutter release mechanism (not shown) whereby both pairs of shutter members are operated simultaneously and in the same manner.

While the invention has been described in detail with reference to the various embodiments shown in the drawings, it is understood that the same have been given merely for the purpose of illustration and are not to be considered as a limitation of the spirit and scope of the invention as defined in the appended claims.

What is claimed is:

1. A focal plane slide shutter for a camera comprising essentially two shutter slides movable relative to each other, two opposite edges of said slides forming an exposure slit therebetween, one of said shutter slides being provided with a picture window, a sliding joint connection between said shutter slides, a driving link pivotally connected to said one shutter slide for driving the other slide, and a gliding joint coupling together said driving link and said driven shutter slide, said slides, driving link and joints being positioned on one plane, an adjustment mechanism for steplessly adjusting the distance between said edges to obtain predetermined exposure slits; means for moving the adjusted shutter slides together transverse to the optical axis of the camera; means for holding the shutter slides at the adjusted distance during their transverse movement; and tensioning and release means connected to at least one of said shutter slides.

2. A slide shutter as defined in claim 1 comprising a plate having a picture window, guide rails mounted on said plate, said shutter slides being arranged for slidable movement in said guide rails, said plate having a longitudinal slot slidably engaging the pivotal joint between the driving link and the said one shutter blade, said shutter slide having a longitudinal slot slidably engaging said gliding joint between the driven shutter slide and the driving link, said driving link being a two-armed lever pivoted on the said one shutter blade in indifferent balance, and a spring being arranged to increase friction between the shutter slides.

3. A focal plane slide shutter for a camera comprising essentially two shutter slides movable relative to each other, two opposite edges of said slides forming an exposure slit therebetween, one of said shutter slides being provided with a picture window, a sliding joint connection between said shutter slides, a driving link pivotally connected to said one shutter slide for driving the other slide, and a gliding joint coupling together said driving link and said driven shutter slide, said slides, driving link and joints being positioned in one plane; an adjustment mechanism for steplessly adjusting the distance between said edges to obtain predetermined exposure slits, said adjustment device consisting of a plate having a picture window, a toothed wheel rotatably mounted on said plate, a toothed segment cooperating with said toothed wheel and being driven thereby, and means for operatively coupling said driving link to said toothed segment in an end position thereof, all parts of the adjustment mechanism being positioned in a plane substantially parallel to the plane of the first-mentioned movement; means for moving the adjusted shutter slides together transversely to the optical axis of the camera; means for holding the shutter slides at the adjusted distance during their transverse movement; and tensioning and release means connected to at least one of said shutter slides.

References Cited in the file of this patent

UNITED STATES PATENTS

| 510,805 | Lewis | Dec. 17, 1893 |
| 1,149,157 | Unbehaun | Aug. 3, 1915 |
| 2,068,911 | Goldhammer | Jan. 26, 1937 |
| 2,134,309 | Mayo et al. | Oct. 25, 1938 |
| 2,367,195 | Bolsey | Jan. 16, 1945 |

FOREIGN PATENTS

| 15,661 | Great Britain | of 1886 |
| 13,918 | Great Britain | of 1896 |
| 296,437 | Germany | May 22, 1919 |
| 329,649 | Great Britain | May 20, 1930 |